(12) United States Patent
Matsuzaki

(10) Patent No.: US 11,241,770 B2
(45) Date of Patent: Feb. 8, 2022

(54) SUPPORT BASE

(71) Applicant: DISCO CORPORATION, Tokyo (JP)

(72) Inventor: Sakae Matsuzaki, Tokyo (JP)

(73) Assignee: DISCO CORPORATION, Tokyo (JP)

(*) Notice: Subject to any disclaimer, the term of this patent is extended or adjusted under 35 U.S.C. 154(b) by 345 days.

(21) Appl. No.: 16/246,724

(22) Filed: Jan. 14, 2019

(65) Prior Publication Data
US 2019/0217440 A1    Jul. 18, 2019

(30) Foreign Application Priority Data

Jan. 17, 2018 (JP) .............................. JP2018-005826

(51) Int. Cl.
| | |
|---|---|
| *B24B 41/06* | (2012.01) |
| *B23Q 17/20* | (2006.01) |
| *B24B 49/14* | (2006.01) |
| *B24B 37/30* | (2012.01) |
| *B24B 27/00* | (2006.01) |
| *B24B 7/22* | (2006.01) |

(52) U.S. Cl.
CPC ............ *B24B 41/068* (2013.01); *B23Q 17/20* (2013.01); *B24B 37/30* (2013.01); *B24B 49/14* (2013.01); *B24B 7/228* (2013.01); *B24B 27/0023* (2013.01)

(58) Field of Classification Search
CPC ....... B24B 41/068; B24B 41/06; B24B 37/30; B24B 37/015; B24B 37/046; B24B 37/04; B24B 37/10; B24B 49/14; B24B 7/228; B24B 27/0023; B24B 27/0069; B23Q 17/20

USPC .................... 451/411, 7, 41, 53, 287, 398
See application file for complete search history.

(56) References Cited

U.S. PATENT DOCUMENTS

| | | | | |
|---|---|---|---|---|
| 5,882,244 | A | * | 3/1999 | Hiyama .............. B24B 37/015 451/285 |
| 7,201,634 | B1 | * | 4/2007 | Naujok ................ B24B 37/015 451/288 |
| 2003/0055526 | A1 | * | 3/2003 | Avanzino ............. B24B 37/015 700/164 |
| 2004/0038623 | A1 | * | 2/2004 | Chandrasekaran ..... B24B 49/10 451/5 |
| 2010/0203806 | A1 | * | 8/2010 | Kitakura .............. B24B 37/015 451/7 |

(Continued)

FOREIGN PATENT DOCUMENTS

| | | | |
|---|---|---|---|
| EP | 2548696 A1 | * 1/2013 | ............ B24B 49/10 |
| JP | 2002283243 A | 10/2002 | |

(Continued)

*Primary Examiner* — Monica S Carter
*Assistant Examiner* — Michael A Gump
(74) *Attorney, Agent, or Firm* — Greer Burns & Crain, Ltd.

(57) ABSTRACT

A support base supports a plate-shaped workpiece. The support base includes a flat plate-shaped box member having a support face for supporting a workpiece and a placement face that is a face on the opposite side to the support face and is placed on a holding face of a chuck table, a temperature measurement unit accommodated in the box member, and a battery accommodated in the box member and serving as a power supply for the temperature measurement unit. The temperature measurement unit includes a temperature measuring instrument that measures a temperature at the support face, and a recording unit that records the temperature measured by the temperature measuring instrument.

10 Claims, 6 Drawing Sheets

(56) References Cited

U.S. PATENT DOCUMENTS

| | | | | |
|---|---|---|---|---|
| 2014/0020829 A1* | 1/2014 | Chen | ....................... | B24B 37/30 |
| | | | | 156/345.13 |
| 2015/0020979 A1* | 1/2015 | Maeda | .............. | H01L 21/67103 |
| | | | | 156/711 |
| 2016/0121452 A1* | 5/2016 | Takahashi | ............. | B24B 37/015 |
| | | | | 451/7 |
| 2018/0158707 A1* | 6/2018 | Hunter | ................ | G06K 7/10366 |
| 2018/0281151 A1* | 10/2018 | Ramaswami | ............ | B24B 37/32 |

FOREIGN PATENT DOCUMENTS

| JP | 2003019671 A | 1/2003 |
|---|---|---|
| JP | 2003229394 A | 8/2003 |

\* cited by examiner

SUPPORT BASE

BACKGROUND OF THE INVENTION

Field of the Invention

The present invention relates to a support base for supporting a workpiece.

Description of the Related Art

A processing technology for grinding a plate-shaped material such as a wafer having a semiconductor device, an optical device or the like formed thereon to thin the plate-shaped material or polishing a plate-shaped material to increase the transverse strength of the plate-shaped material is known (refer, for example, to Japanese Patent No. 4546659, Japanese Patent No. 3980898 and Japanese Patent Laid-Open No. 2003-19671). The grinding process and the polishing process described in the above-mentioned patent documents are carried out by contacting a tool such as a grindstone or a polishing pad, which rotates at a high speed, with a grinding target surface to scrape off the workpiece.

SUMMARY OF THE INVENTION

When a workpiece is processed by the grinding process or the polishing process disclosed in the above-mentioned patent documents, the temperature at the contact point between the tool and the workpiece becomes high, and if the temperature at the contact point becomes excessively high, then a processing defect sometimes occurs in that the tool is damaged or the workpiece burns. Therefore, in the grinding process or the polishing process described above, it is desired to grasp the temperature at the processing point (contact point) in the case where a processing defect occurs. However, in the case where the grinding process or the polishing process described above is carried out especially while working fluid such as pure water is being supplied, it is difficult to measure the temperature at the processing point (contact point).

Therefore, it is an object of the present invention to provide a support base that makes it possible to grasp the temperature at a processing point.

In accordance with an aspect of the present invention, there is provided a support base for supporting a plate-shaped workpiece, including a flat plate-shaped box member having a support face for supporting the workpiece and a placement face that is a face on the opposite side to the support face and is placed on a holding face of a chuck table; a temperature measurement unit accommodated in the box member; and a battery accommodated in the box member and serving as a power supply for the temperature measurement unit, in which the temperature measurement unit includes a temperature measuring instrument configured to measure a temperature at the support face; and a recording unit configured to record the temperature measured by the temperature measuring instrument accommodated in the box member.

Preferably, the temperature measurement unit further includes wireless communication means for sending out originating temperature information measured by the temperature measuring instrument to the outside of the box member.

Preferably, an electrode to which power is supplied from the battery is provided on the support face, and the workpiece is electrostatically attracted to the support face.

Preferably, the workpiece is polished in a state in which the workpiece is held on the chuck table through the support base.

The support base of the present invention demonstrates an advantageous effect that the temperature at a processing point can be grasped.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Embodiments of the present invention are described in detail with reference to the drawings. The present invention is not restricted by the substance described in the following description of the embodiments. Further, components described below include those that can be conceived readily by those skilled in the art and include substantially same ones. Furthermore, it is possible to suitably combine the configurations described below. Further, various omissions, replacements and changes in configuration can be performed without departing from the subject matter of the present invention.

First Embodiment

Figure 1:
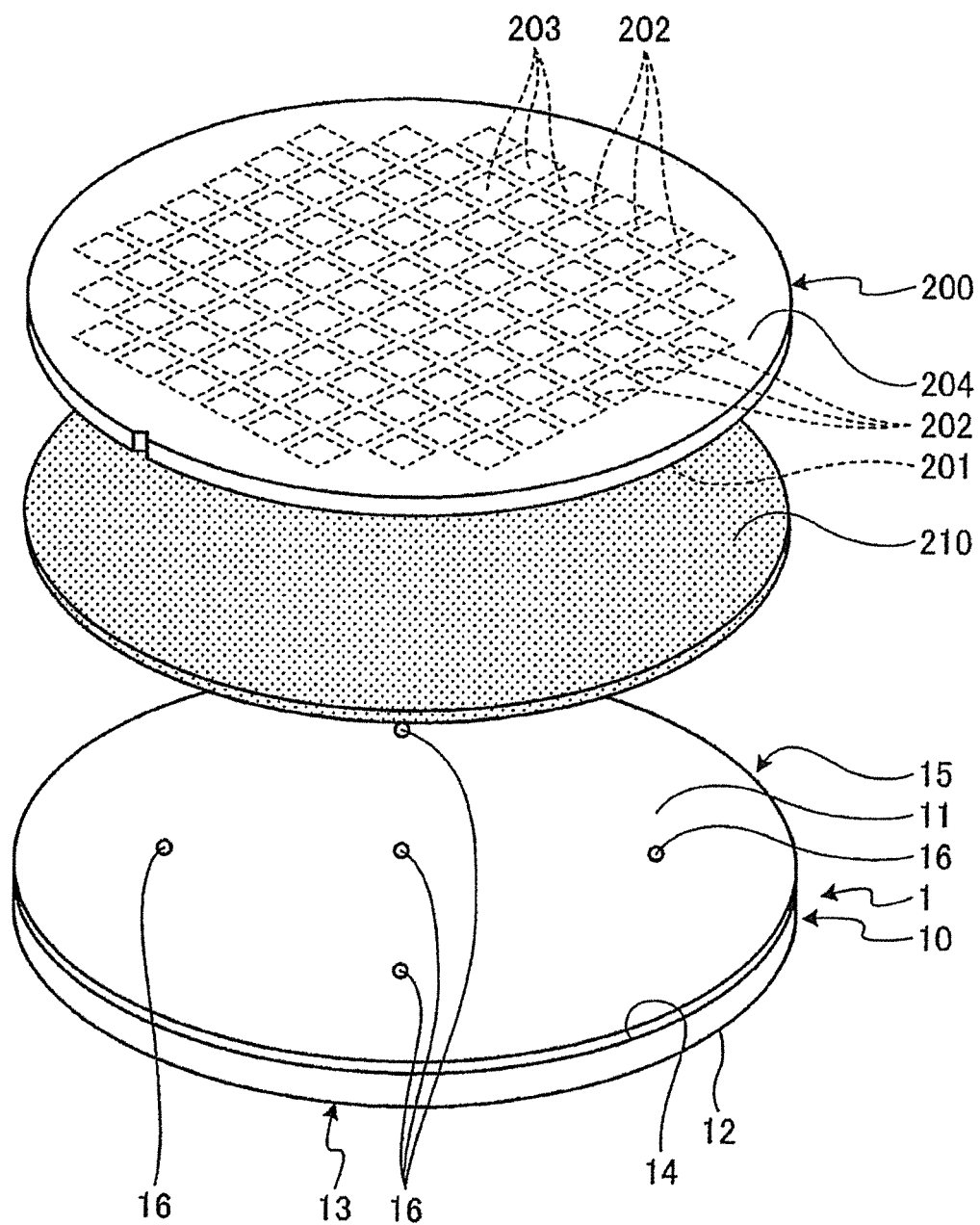
FIG. 1 is a perspective view depicting a support base according to a first embodiment and a workpiece.
Figure 2:
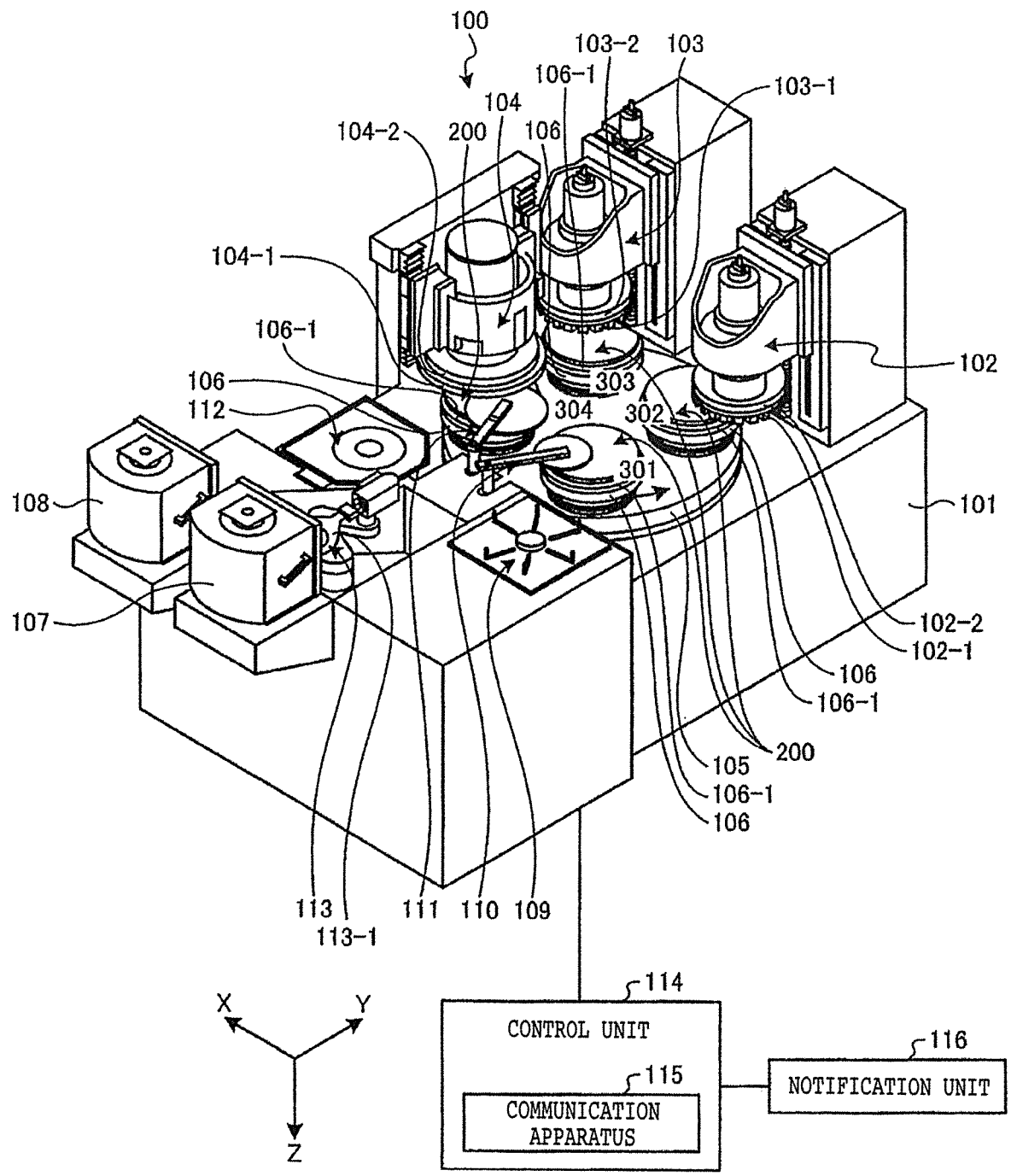
FIG. 2 is a perspective view of a configuration example of a grinding and polishing apparatus that grinds and polishes a workpiece supported by the support base according to the first embodiment.
Figure 3:
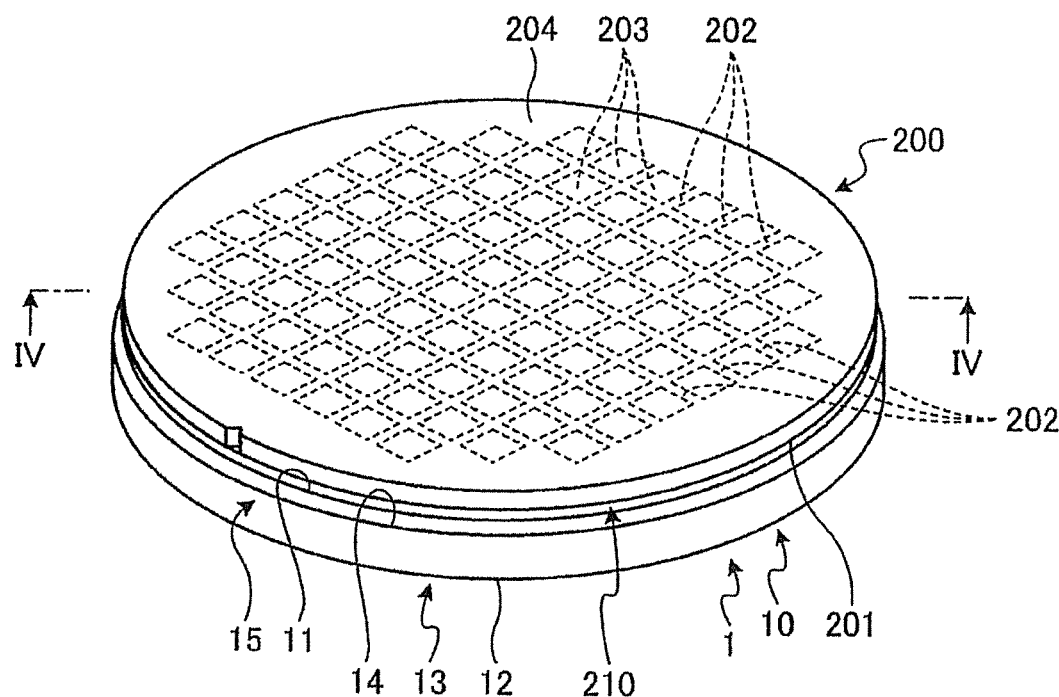
FIG. 3 is a perspective view depicting a state in which the support base according to the first embodiment supports a workpiece thereon.
Figure 4:
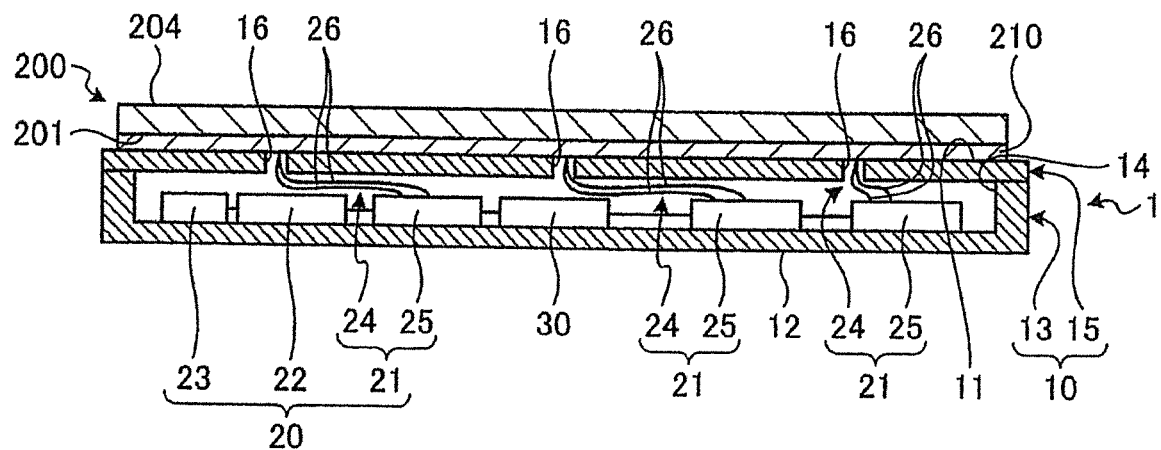
FIG. 4 is a sectional view taken along line IV-IV of FIG. 3.
Figure 5:
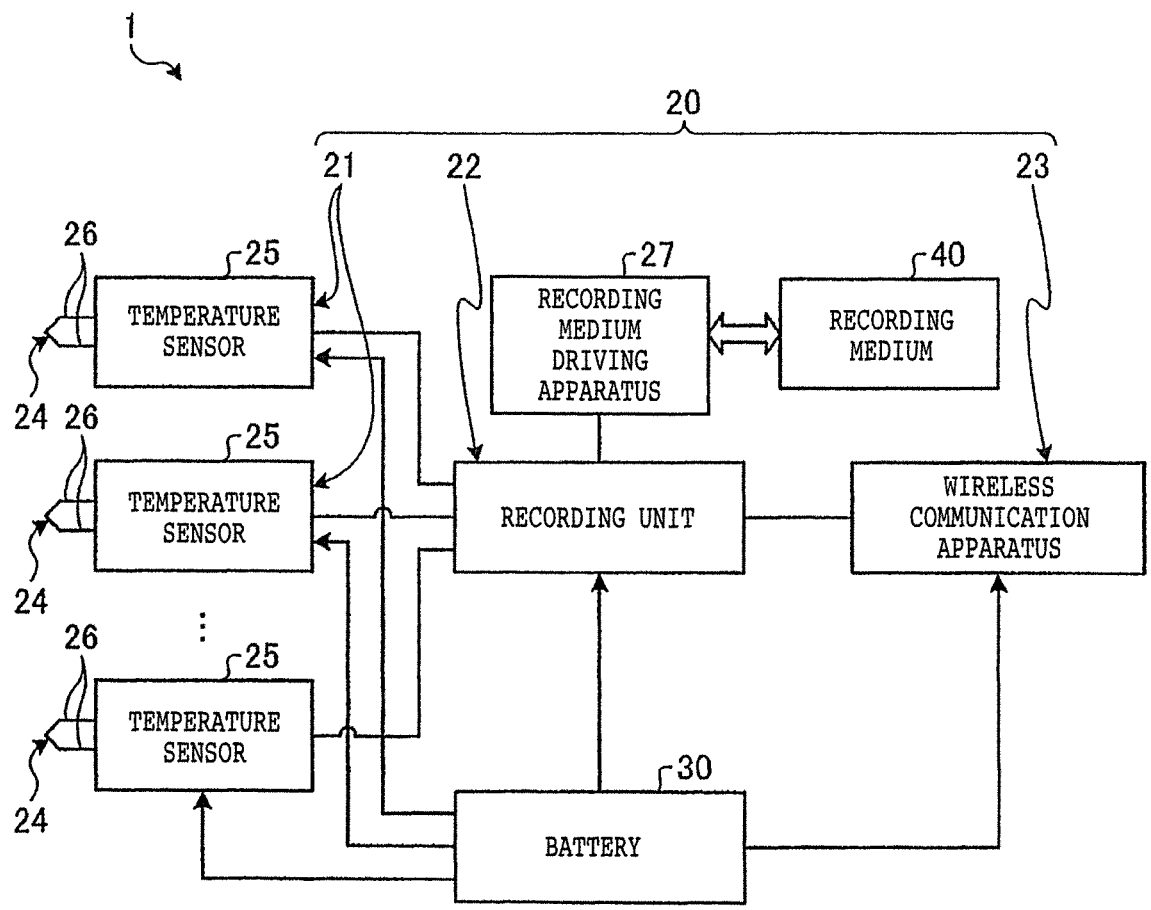
FIG. 5 is a block diagram depicting a configuration of the support base according to the first embodiment.

A support base according to a first embodiment of the present invention is described with reference to the drawings. FIG. 1 is a perspective view depicting a support base according to the first embodiment and a workpiece. FIG. 2 is a perspective view of a configuration example of a grinding and polishing apparatus that grinds and polishes a workpiece supported by the support base according to the first embodiment. FIG. 3 is a perspective view depicting a state in which the support base according to the first embodiment supports a workpiece thereon. FIG. 4 is a sectional view taken along line IV-IV of FIG. 3. FIG. 5 is a block diagram depicting a configuration of the support base according to the first embodiment.

The support base 1 according to the first embodiment depicted in FIG. 1 supports a workpiece 200 thereon. The workpiece 200 is a disk-shaped semiconductor wafer made of silicon as a base material or an optical device wafer made of sapphire, SiC (silicon carbide) or the like. As depicted in FIG. 1, the workpiece 200 has devices 203 formed in regions partitioned by a plurality of scheduled division lines 202 formed in a grid pattern on a front face 201 thereof. The workpiece 200 is supported at the front face 201 side thereof on the support base 1 by an adhesive member 210, and in this state, grinding is performed for a rear face 204, which is on the reverse side to the front face 201, so as to thin the workpiece 200 to a predetermined thickness. Thereafter, polishing is performed for the rear face 204.

In the first embodiment, the workpiece 200 is ground at the rear face 204 for thinning and is polished in order to flatten the ground rear face 204 with a high degree of accuracy by a grinding and polishing apparatus 100 depicted in FIG. 2.

As depicted in FIG. 2, the grinding and polishing apparatus 100 includes, as principal components thereof, an apparatus main body 101, a first grinding unit 102, a second grinding unit 103, a polishing unit 104, for example, four chuck tables 106 installed on a turn table 105, cassettes 107 and 108, a positioning unit 109, a loading unit 110, an unloading unit 111, a washing unit 112, a unloading and loading unit 113 and a control unit 114.

In the first grinding unit 102, while a grinding wheel 102-2 having a grindstone 102-1 mounted at a lower end of a spindle is rotated, the grinding wheel 102-2 is pressed along a Z-axis direction parallel to the vertical direction against the rear face 204 of the workpiece 200 held on the chuck table 106 of a rough grinding position 302 to roughly grind the rear face 204 of the workpiece 200. Similarly, in the second grinding unit 103, while a grinding wheel 103-2 having a grindstone 103-1 mounted at a lower end of a spindle is rotated, the grinding wheel 103-2 is pressed along the Z-axis direction against the rear face 204 of the workpiece 200 already ground roughly and held by the chuck table 106 positioned at a finish grinding position 303 to finish grind the rear face 204 of the workpiece 200.

It is to be noted that, in the first embodiment, axes that are the centers of rotation of the grinding wheels 102-2 and 103-2 of the first grinding unit 102 and the second grinding unit 103 and axes that are the center of rotation of the chuck tables 106 extend in parallel to each other and are disposed in a spaced relationship from each other in a horizontal direction. It is to be noted that, in the first embodiment, the grinding units 102 and 103 grind the rear face 204 of the workpiece 200 while grinding water such as pure water is supplied to the workpiece 200.

As depicted in FIG. 2, in the polishing unit 104, a polishing pad 104-1 of a polishing tool 104-2 mounted at a lower end of a spindle is disposed in an opposing relationship to a holding face 106-1 of the chuck table 106. In the polishing unit 104, while the polishing tool 104-2 is rotated, it is pressed along the Z-axis direction against the rear face 204 of the workpiece 200 held by the holding face 106-1 of the chuck table 106 positioned at a polishing position 304 and finish ground already. In the polishing unit 104, the polishing pad 104-1 of the polishing tool 104-2 is pressed along the Z-axis direction against the rear face 204 of the workpiece 200 to polish the rear face 204 of the workpiece 200. Further, a portion of the rear face 204 of the workpiece 200 with which the grindstones 102-1 and 103-1 of the grinding units 102 and 103 and the polishing pad 104-1 of the polishing unit 104 contact is a processing point at which the grinding units 102 and 103 and the polishing unit 104 grind and polish the rear face 204 of the workpiece 200.

The turn table 105 is a disk-shaped table provided on an upper face of the apparatus main body 101 and is provided for rotation within a horizontal plane and driven to rotate at a predetermined timing. For example, the four chuck tables 106 are disposed at equal intervals, for example, with a phase angle of 90 degrees on the turntable 105. The four chuck tables 106 have a chuck table structure including a vacuum chuck on the holding face 106-1 and suck the support base 1 placed on the holding face 106-1 by vacuum to hold the workpiece 200 through the support base 1. Upon grinding and polishing, the chuck tables 106 are driven to rotate within a horizontal plane by a rotational driving mechanism around a rotational axis given by an axis parallel to the vertical direction. Each of such chuck tables 106 as just described is successively moved to a loading and unloading position 301, the rough grinding position 302, the finish grinding position 303, the polishing position 304 and the loading and unloading position 301 by rotation of the turn table 105.

The cassettes 107 and 108 are vessels having a plurality of slots for accommodating workpieces 200 therein. The cassette 107 accommodates therein workpieces 200, each of which has the support base 1 adhered to the front face 201 before grinding and polishing by the adhesive member 210. Meanwhile, the other cassette 108 accommodates workpieces 200 after grinding and polishing therein. Further, the positioning unit 109 is a table for performing, when a workpiece 200 taken out from the cassette 107 is temporarily placed on the positioning unit 109, center alignment of the workpiece 200.

The loading unit 110 has a suction pad and sucks and holds a workpiece 200 before grinding and polishing positioned by the positioning unit 109 to load the workpiece 200 to the chuck table 106 positioned at the loading and unloading position 301. The unloading unit 111 sucks and holds a workpiece 200 after grinding and polishing held on the chuck table 106 positioned at the loading and unloading position 301 to unload the workpiece 200 to the washing unit 112.

The unloading and loading unit 113 is a robot pick including, for example, a U-shaped hand 113-1, and sucks and holds the support base 1 or a workpiece 200 by the U-shaped hand 113-1 to load the workpiece 200 adhered to the support base 1. In particular, the unloading and loading unit 113 unloads a workpiece 200 before grinding and polishing from the cassette 107 to the positioning unit 109 and loads a workpiece 200 after grinding and polishing from the washing unit 112 into the cassette 108. The washing unit 112 washes a workpiece 200 after grinding and polishing to remove contaminations such as grinding scraps or polishing scraps sticking to the ground and polished processing face.

The control unit 114 controls the components described above that configure the grinding and polishing apparatus 100. In particular, the control unit 114 controls the grinding and polishing apparatus 100 to execute grinding operation for a workpiece 200. The control unit 114 is a computer that can execute a computer program. The control unit 114 includes an arithmetic processing apparatus having a microprocessor like a CPU (Central Processing Unit), a storage apparatus having a memory such as a ROM (Read Only Memory) or a RAM (Random Access Memory), and an input/output interface apparatus. The arithmetic processing apparatus of the control unit 114 executes a computer program stored in the storage apparatus to generate a control signal for controlling the grinding and polishing apparatus 100. The arithmetic processing apparatus of the control unit 114 outputs the generated control signal to the associated components of the grinding and polishing apparatus 100 through the input/output interface apparatus.

Further, the control unit 114 includes a communication apparatus 115 that can bidirectionally communicate with a wireless communication apparatus 23 hereinafter described of the support base 1. The communication apparatus 115 can bidirectionally communicate information with the wireless communication apparatus 23 of the support base 1.

Further, the control unit 114 is connected to a display unit not depicted configured from a liquid crystal display apparatus or the like that displays a state of processing operation, an image or the like, an inputting unit that is used when an operator tries to register processing substance information or the like, and a notification unit 116. The inputting unit is configured from at least one of a touch panel provided on the display unit, a keyboard and so forth. The notification unit 116 receives an error signal from the control unit 114 to generate at least one of light and sound to notify the operator that an error signal is received.

Now, the support base 1 according to the first embodiment is described with reference to the drawings. As depicted in FIGS. 1 and 3, the support base 1 includes a flat plate-shaped box member 10. The box member 10 is formed so as to have an appearance of a disk, and has an upper face that serves as a support face 11 that supports the front face 201 side of the workpiece 200 with the adhesive member 210 interposed therebetween and has a lower face on the opposite side to the support face 11, which is a placement face 12 to be placed on the holding face 106-1. In other words, the support base 1 includes the support face 11 and the placement face 12 that is the lower face on the opposite side to the support face 11 and is to be placed on the holding face 106-1. The support face 11 and the placement face 12 are formed flat and disposed in parallel to each other.

In the first embodiment, as depicted in FIGS. 1, 3 and 4, the box member 10 includes a box main body 13 of a bottomed cylindrical shape having a lower face as the placement face 12, and a lid member 15 formed in a disk shape and having an upper face that serves as the support face 11 and closes up an opening 14 of the box main body 13. The box main body 13 and the lid member 15 are fixed to each other. Further, the box main body 13 has, on the inner side thereof, a plurality of posts not depicted that extend from the bottom face toward the lid member 15 until they contact with the lid member 15. The lid member 15 has at least one through-hole 16 provided therein as depicted in FIG. 1. The through-hole 16 extends through the lid member 15. In the first embodiment, one through-hole 16 is provided at the center of the lid member 15 and four through-holes 16 are provided at equal intervals in a circumferential direction on an outer edge portion of the lid member 15, and consequently, totaling five through-holes 16 are provided.

The adhesive member 210 configured from a bonding agent or the like is laminated on the support face 11 such that, where the adhesive member 210 is adhered to the front face 201 side of the workpiece 200, the front face 201 side of the workpiece 200 is fixed on the support face 11 as depicted in FIG. 4. Further, the box member 10 is placed, in a state in which a workpiece 200 is fixed to the support face 11, at the placement face 12 thereof on the holding face 106-1 of the chuck table 106 and is sucked to and held on the holding face 106-1. The support base 1 is accommodated in the cassette 107 or 108 in such a state that the front face 201 side of the workpiece 200 is fixed to the support face 11. Therefore, the workpiece 200 is ground and polished in a state in which it is sucked to and held on the chuck table 106 through the support base 1.

Further, the support base 1 includes a temperature measurement unit 20 and a battery 30 as depicted in FIGS. 4 and 5. The temperature measurement unit 20 and the battery 30 are accommodated in the box member 10 as depicted in FIG. 4. The temperature measurement unit 20 measures the temperature of the support face 11 through the through-hole 16 and includes at least one temperature measuring instrument 21, a recording unit 22, and the wireless communication apparatus 23 serving as wireless communication means.

The temperature measuring instrument 21 measures the temperature on the support face 11 through the through-hole 16, and in the first embodiment, five such temperature measuring instruments 21 are provided corresponding one to one to the through-holes 16. Each temperature measuring instrument 21 measures the temperature of the support face 11 around the corresponding through-hole 16 through the adhesive member 210 exposed in the through-hole 16. The temperature measuring instrument 21 includes a thermocouple 24 and a temperature sensor 25. The thermocouple 24 includes a pair of metal wires 26 that are configured from metals different from each other and connected at distal ends thereof to each other and are attached to the adhesive member 210 through the through-hole 16.

To the temperature sensor 25, the pair of metal wires 26 of the thermocouple 24 are connected at proximal ends thereof such that, by measuring the voltage or the like of thermal electromotive force generated between the opposite ends of the pair of metal wires 26, the temperature of the adhesive member 210 to which the distal ends of the pair of metal wires 26 are attached is measured. The temperature sensor 25 outputs a result of the measurement to the recording unit 22.

The recording unit 22 records the temperature of the adhesive member 210 measured by each temperature measuring instrument 21 and is a computer that includes an arithmetic processing apparatus including a microprocessor such as a CPU (Central Processing Unit) and a storage apparatus including a memory such as a ROM (Read Only Memory) or a RAM (Random Access Memory). The recording unit 22 records a measurement result of each temperature measuring instrument 21 outputted from the temperature sensor 25 of the temperature measuring instrument 21 into the storage apparatus.

Further, the recording unit 22 includes a recording medium driving apparatus 27 that stores a measurement result of each temperature measuring instrument 21 outputted from the temperature sensor 25 of the temperature measuring instrument 21 into a recording medium 40. The recording medium driving apparatus 27 allows removable loading of a recording medium 40 thereon and records a measurement result of each temperature measuring instrument 21 into the recording medium 40 loaded therein. While, in the first embodiment, the recording medium 40 is configured from an SD memory card (Secure Digital memory card) or an SRAM (Static Random Access Memory) cassette, it is not limited to an SD memory card or an SRAM cassette but may be configured from a magnetic disk, an optical disk or a magneto-optical disk. Further, in the first embodiment, the recording unit 22 records a measurement result of each temperature measuring instrument 21 in an associated relationship with the date and time of the measurement into the storage apparatus and the recording medium 40. The measurement result of each temperature measuring instrument 21 associated with the date and time of the measurement is temperature information measured by each temperature measuring instrument 21. In the present specification, a measurement result of each temperature measuring instrument 21 associated with the date and time of the measurement is hereinafter referred to as information indicative of the measurement result of each temperature measuring instrument 21. The recording unit 22 outputs information indicative of the measurement result of each temperature measuring instrument 21 recorded in the storage apparatus to the wireless communication apparatus 23.

The wireless communication apparatus 23 is a wireless communication apparatus that originates information indicative of a measurement result of each temperature measuring instrument 21 that is temperature information measured by the temperature measuring instrument 21 to the communication apparatus 115 of the control unit 114 provided externally of the box member 10. The wireless communication apparatus 23 wirelessly transmits information outputted from the recording unit 22 and indicative of a measurement result of each temperature measuring instrument 21 to the communication apparatus 115 of the control unit 114 after every predetermined interval of time or when an instruction to transmit information is received.

The battery 30 serves as a power supply for driving the temperature sensor 25, recording unit 22 and wireless communication apparatus 23 of each temperature measuring instrument 21 of the temperature measurement unit 20. The battery 30 is a primary cell or a secondary battery. The battery 30 supplies power necessary for the temperature sensor 25, recording unit 22 and wireless communication apparatus 23 of each temperature measuring instrument 21 of the temperature measurement unit 20. Although the battery 30 in the first embodiment is a so-called button-type battery, in the present invention, the battery 30 is not limited to a button-type battery.

Now, processing operation of the grinding and polishing apparatus 100 depicted in FIG. 2 for successively carrying out rough grinding, finish grinding and polishing for a workpiece 200 is described. In the grinding and polishing apparatus 100, the cassette 107 in which workpieces 200 each having a front face 201 fixed to a support base 1 through an adhesive member 210 are accommodated and the cassette 108 in which no workpiece 200 is accommodated are attached to the apparatus main body 101. If an operator registers processing substance information into the control unit 114 and a starting instruction for processing operation is inputted from the operator to the control unit 114, then the grinding and polishing apparatus 100 starts processing operation.

In the processing operation, the control unit 114 of the grinding and polishing apparatus 100 controls the unloading and loading unit 113 to take out a workpiece 200 from the cassette 107 and unload the workpiece 200 into the positioning unit 109 and controls the positioning unit 109 to perform center alignment of the workpiece 200. In the processing operation, the control unit 114 of the grinding and polishing apparatus 100 controls the loading unit 110 to load the center-aligned workpiece 200 onto the chuck table 106 positioned at the loading and unloading position 301.

In the processing operation, the control unit 114 of the grinding and polishing apparatus 100 controls the chuck table 106 to suck and hold the front face 201 side of the workpiece 200 through the support base 1 with the rear face 204 exposed and controls the turn table 105 to successively transport the workpiece 200 to the rough grinding position 302, finish grinding position 303, polishing position 304 and loading and unloading position 301 to successively perform rough grinding, finish grinding and polishing to flatten the rear face 204 of the workpiece 200 with high accuracy. It is to be noted that, in the processing operation, every time the turn table 105 of the grinding and polishing apparatus 100 rotates 90 degrees, the workpiece 200 before grinding and polishing is loaded to the support base 1 of the loading and unloading position 301.

The control unit 114 of the grinding and polishing apparatus 100 controls the turntable 105 to position the workpiece 200 polished by the polishing unit 104 to the loading and unloading position 301, controls the unloading unit 111 to load the workpiece 200 into the washing unit 112, controls the washing unit 112 to wash the workpiece 200 and controls the unloading and loading unit 113 to load the workpiece 200 after washing into the cassette 108. After grinding and polishing for all workpieces 200 in the cassette 107 are carried out, the control unit 114 of the grinding and polishing apparatus 100 ends the processing operation.

Further, in the control unit 114 of the grinding and polishing apparatus 100, information transmitted from the wireless communication apparatus 23 of each support base 1 and indicative of a measurement result of each temperature measuring instrument 21 is received after every predetermined interval of time by the communication apparatus 115, and the received information indicative of the measurement result of each temperature measuring instruments 21 is stored in an associated relationship with the support base 1 or the like into the storage apparatus. If the information indicative of the measurement results of the temperature measuring instruments 21 received by the communication apparatus 115 includes information indicating that the measurement result is a temperature exceeding a threshold value determined in advance, then the control unit 114 of the grinding and polishing apparatus 100 transmits an error signal to the notification unit 116 and notifies the notification unit 116 of this to stop the processing operation of the grinding and polishing apparatus 100. When the control unit 114 causes the operation process to stop, the grinding and polishing apparatus 100 re-starts the processing operation after a re-starting work is performed by the operator or the like. It is to be noted that the threshold value described above is a temperature at which a processing defect occurs such as a temperature at which one of the grinding wheels 102-2 and 103-2 and the polishing tool 104-2 is damaged or may possibly be damaged, a temperature at which the workpiece 200 may possibly burn or the like.

As described above, the support base 1 according to the first embodiment is configured to support a workpiece 200 during processing and has the support face 11 to which a workpiece 200 is fixed, and the temperature measurement unit 20 includes the temperature measuring instrument 21 that measures the temperature of the support face 11 through the adhesive member 210. Therefore, the support base 1 demonstrates an advantageous effect that the temperature of the processing point of the rear face 204 of the workpiece 200 during processing can be grasped directly through the adhesive member 210.

Further, in the support base 1 according to the first embodiment, the recording unit 22 records information indicative of a measurement result measured by the temperature measuring instrument 21 into the recording apparatus and the recording medium 40. Therefore, in the support base 1, especially by grasping the information indicative of the measurement result recorded in the recording medium 40, when a processing defect occurs, it is possible to analyze a cause of the processing defect.

Further, the support base 1 according to the first embodiment includes the wireless communication apparatus 23 that originates information indicative of a measurement result measured by the temperature measuring instrument 21 to the outside of the box member 10. Therefore, the support base 1 makes it possible for the operator or the like to grasp, during processing, information indicative of a measurement result originated from the wireless communication apparatus 23 on the real time basis. Further, information indicative of a measurement result of each temperature measuring instrument 21 transmitted from the wireless communication apparatus 23 of the support base 1 is received by the communication apparatus 115, and the control unit 114 of the grinding and polishing apparatus 100 decides whether or not the information indicative of the measurement result of each temperature measuring instrument 21 is a temperature exceeding a threshold value. Therefore, the control unit 114 of the grinding and polishing apparatus 100 can grasp on the real time basis during processing that there is the possibility that a processing defect may occur. Further, if the control unit 114 of the grinding and polishing apparatus 100 decides that the information indicative of the measurement result of one of the temperature measuring instruments 21 represents a temperature exceeding the threshold value, then since it stops the processing operation, occurrence of a processing defect can be suppressed.

Further, the support base 1 according to the first embodiment causes a workpiece 200 to be ground and polished in a state in which the workpiece 200 is fixed to the support face 11 and held on the chuck table 106 of the grinding and polishing apparatus 100. Therefore, since the support base 1 is held on the chuck table 106 together with the workpiece 200, the temperature at the processing point of the workpiece 200 can be measured through the adhesive member 210 during processing.

Second Embodiment

Figure 6:
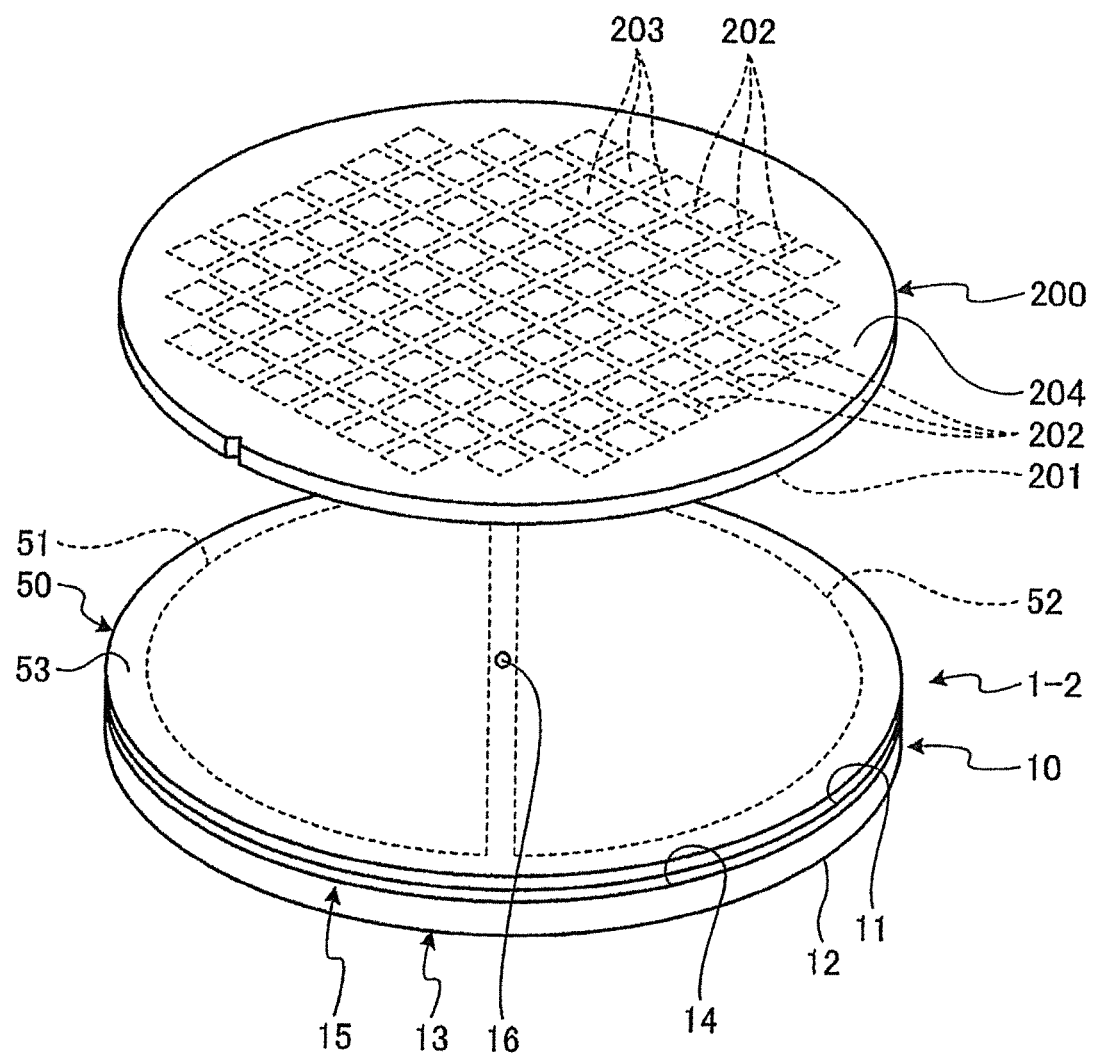
FIG. 6 is a perspective view depicting a support base according to a second embodiment and a workpiece.
Figure 7:
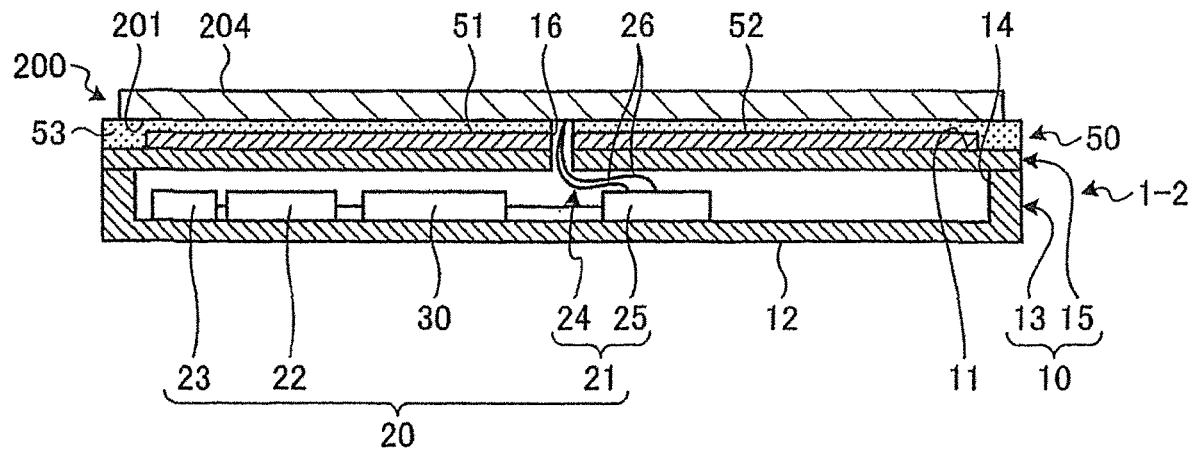
FIG. 7 is a sectional view depicting a state in which the support base according to the second embodiment supports a workpiece thereon.
Figure 8:
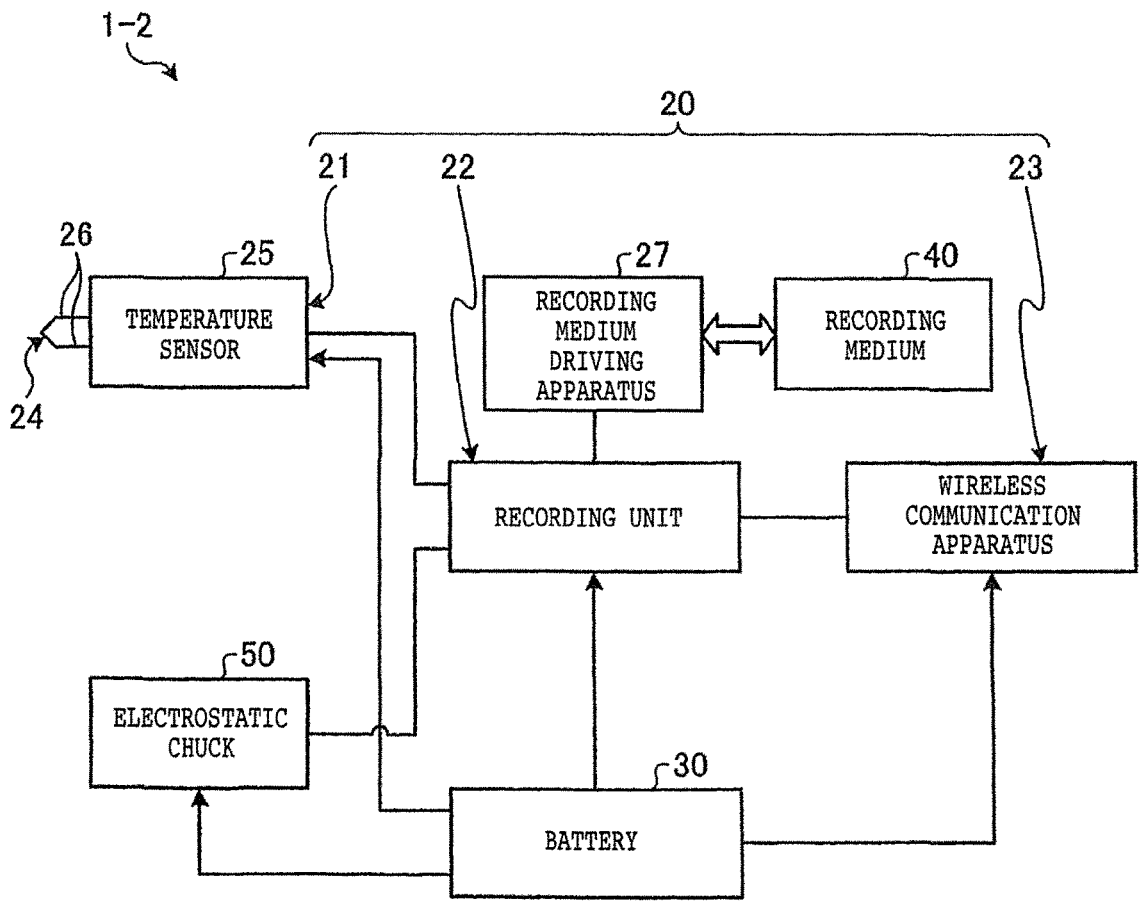
FIG. 8 is a block diagram depicting a configuration of the support base according to the second embodiment.

A support base according to a second embodiment of the present invention is described with reference to the drawings. FIG. 6 is a perspective view depicting the support base according to the second embodiment and a workpiece. FIG. 7 is a sectional view depicting a state in which the support base according to the second embodiment supports a workpiece thereon. FIG. 8 is a block diagram depicting a configuration of the support base according to the second embodiment. In FIGS. 6, 7 and 8, like elements to those of the first embodiment are denoted by like reference characters, and description of them is omitted.

The support base 1-2 according to the second embodiment is the same in configuration as that of the first embodiment except that the fixation method of a workpiece 200 to the support face 11 and the number of temperature measuring instruments 21 are different. The support base 1-2 according to the second embodiment includes an electrostatic chuck (ESC) 50 for holding a workpiece 200 as depicted in FIGS. 6, 7 and 8.

The electrostatic chuck 50 includes a positive electrode 51 and a negative electrode 52 provided on the support face 11 of the lid member 15, and a resin layer 53 that covers the electrodes 51 and 52. The positive electrode 51 is supplied with positive power from the battery 30. The negative electrode 52 is supplied with negative power from the battery 30. The electrodes 51 and 52 are configured from indium tin oxide (ITO) or the like. The resin layer 53 has an upper face formed flat along the support face 11. Since positive power is supplied to the positive electrode 51 and negative power is supplied to the negative electrode 52, the electrostatic chuck 50 electrostatically attracts a workpiece 200 to the support face 11 through the resin layer 53 by electrostatic attractive force generated between the electrodes 51 and 52. In this manner, in the second embodiment, the workpiece 200 is electrostatically attracted to the support face 11 through the electrostatic chuck 50 while the support face 11 supports the workpiece 200 through the electrostatic chuck 50.

The support base 1-2 according to the second embodiment has only one through-hole 16 provided at the center of the box member 10. The through-hole 16 extends through the lid member 15 and the resin layer 53 of the box member 10. The support base 1-2 according to the second embodiment includes only one temperature measuring instrument 21, and a pair of metal wires 26 of a thermocouple 24 connected to the temperature sensor 25 are directly attached to the front face 201 of the workpiece 200 through the through-hole 16.

In the support base 1-2 according to the second embodiment, a workpiece 200 is fixed to the support face 11 thereof, and the temperature measurement unit 20 includes a temperature measuring instrument 21 that measures the temperature of the support face 11. Therefore, the support base 1-2 can grasp the temperature at the processing point of the rear face 204 of the workpiece 200 similarly as in the first embodiment. Further, in the support base 1-2 according to the second embodiment, since the pair of metal wires 26 of the thermocouple 24 of the temperature measuring instrument 21 are directly attached to the front face 201 of the workpiece 200, the temperature at the processing point of the rear face 204 of the workpiece 200 can be grasped with a higher degree of accuracy.

It is to be noted that the present invention is not limited to the embodiments described above. In other words, the present invention can be carried out in various modified forms without departing from the scope and spirit thereof. While the embodiments described above are directed to an example in which the support base 1 is used in the grinding and polishing apparatus 100 that includes the grinding units 102 and 103 and the polishing unit 104, according to the present invention, the support bases 1 and 1-2 may be used in a processing apparatus that includes at least one of the grinding units 102 and 103 and the polishing unit 104. Further, while, in the embodiments, the control unit 114 of the grinding and polishing apparatus 100 receives information indicative of a measurement result of the temperature measuring instrument 21 originated from the wireless communication apparatus 23 of the support bases 1 and 1-2, in the present invention, a reception apparatus different from an apparatus that configures a processing apparatus such as the grinding and polishing apparatus 100 may receive information indicative of a measurement result of the temperature measuring instrument 21 and record the information into a storage apparatus.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A support base for supporting a plate-shaped workpiece, comprising:

a flat plate-shaped box member comprising a lid member and a box main body that defines an opening therein, wherein the lid member is formed of a disk shape, and is fixed to the box main body, the lid member having a support face for supporting the workpiece, and the box main body having a placement face, wherein the placement face is on an opposite side to the support face and is configured to be placed on a holding face of a chuck table;

a temperature measurement unit accommodated in the opening of the box member; and a battery accommodated in the opening of the box member and serving as a power supply for the temperature measurement unit; wherein the temperature unit includes:

a temperature measuring instrument configured to measure a temperature at the support face; and a recording unit configured to record the temperature measured by the temperature measuring instrument accommodated in the box member, and wherein an electrode to which power is supplied from the battery is provided on the support face, and the workpiece is electrostatically attracted to the support face.

2. The support base according to claim 1, wherein the lid member has at least one through-hole provided therein.

3. A processing apparatus for processing a plate-shaped workpiece, wherein the processing apparatus comprises:

a processing unit including a rotating spindle;

a chuck table; and a support base for supporting the workpiece, wherein the support base comprises:

a flat plate-shaped box member comprising a lid member and a box main body, the lid member having a support face for supporting the workpiece, and the box main body having a placement face, wherein the placement face is on an opposite side to the support face and is configured to be placed on a holding face of the chuck table;

a temperature measurement unit accommodated in the box member; and a battery accommodated in the box member and serving as a power supply for the temperature measurement unit;

wherein the temperature measurement unit includes:

a temperature measuring instrument configured to measure a temperature at the support face; and a recording unit configured to record the temperature measured by the temperature measuring instrument accommodated in the box member, and wherein the placement face of the box main body is in direct contact with the holding face of the chuck table, and wherein the processing unit comprises a polishing unit that includes a polishing pad configured and arranged to rotate with the rotating spindle.

4. The processing apparatus according to claim 3, wherein the temperature measurement unit further includes wireless communication means for sending out originating temperature information measured by the temperature measuring instrument to the outside of the box member.

5. The processing apparatus according to claim 3, wherein an electrode to which power is supplied from the battery is provided on the support face, and the workpiece is electrostatically attracted to the support face.

6. The processing apparatus according to claim 3, wherein the workpiece is polished in a state in which the workpiece is held on the chuck table through the support base.

7. The processing apparatus according to claim 3, wherein the box main body and the lid member are configured to be fixed together.

8. The processing apparatus according to claim 3, wherein the lid member has at least one through-hole provided therein.

9. A processing apparatus for processing a plate-shaped workpiece, wherein the processing apparatus comprises:

a processing unit including a rotating spindle;

a chuck table; and a support base for supporting the workpiece, wherein the support base comprises:

a flat plate-shaped box member comprising a lid member and a box main body, the lid member having a support face for supporting the workpiece, and the box main body having a placement face, wherein the placement face is on an opposite side to the support face and is configured to be placed on a holding face of the chuck table;

a temperature measurement unit accommodated in the box member; and a battery accommodated in the box member and serving as a power supply for the temperature measurement unit;

wherein the temperature measurement unit includes:

a temperature measuring instrument configured to measure a temperature at the support face; and a recording unit configured to record the temperature measured by the temperature measuring instrument accommodated in the box member, and wherein the placement face of the box main body is in direct contact with the holding face of the chuck table, and wherein an electrode to which power is supplied from the battery is provided on the support face, and the workpiece is electrostatically attracted to the support face.

10. The processing apparatus according to claim 9, wherein the processing unit comprises a grinding unit that includes a grinding wheel configured and arranged to rotate with the rotating spindle.

* * * * *